(12) United States Patent
Fujino (10) Patent No.: US 6,943,049 B2
(45) Date of Patent: Sep. 13, 2005

(54) METHOD FOR MAKING A REFLECTIVE LIQUID CRYSTAL DISPLAY DEVICE

(75) Inventor: Masahiro Fujino, Kanagawa (JP)

(73) Assignee: Sony Corporation, Tokyo (JP)

( * ) Notice: Subject to any disclaimer, the term of this patent is extended or adjusted under 35 U.S.C. 154(b) by 374 days.

(21) Appl. No.: 09/951,162

(22) Filed: Sep. 12, 2001

(65) Prior Publication Data

US 2002/0075423 A1 Jun. 20, 2002

(30) Foreign Application Priority Data

Sep. 14, 2000 (JP) ..................................... P2000-281012
Nov. 28, 2000 (JP) ..................................... P2000-361080

(51) Int. Cl.$^7$ ............................................. H01L 21/00
(52) U.S. Cl. ............................. 438/29; 438/30; 438/69; 438/71; 438/72
(58) Field of Search ............................. 438/22, 29, 30, 438/57, 69, 71, 72, 96, 149, 151, 163, 164, 496, 584, 585, 608, 609, 669, 673, 725, 778, 780

(56) References Cited

U.S. PATENT DOCUMENTS

| | | | |
|---|---|---|---|
| 5,407,784 A | * | 4/1995 | Berrier et al. ............ 430/287.1 |
| 5,500,750 A | * | 3/1996 | Kanbe et al. ................. 349/42 |
| 5,526,149 A | * | 6/1996 | Kanbe et al. ................ 349/113 |
| 5,691,791 A | * | 11/1997 | Nakamura et al. .......... 349/113 |
| 5,805,252 A | * | 9/1998 | Shimada et al. ............ 349/113 |
| 6,136,624 A | * | 10/2000 | Kemmochi et al. ........... 438/30 |
| 6,400,426 B1 | * | 6/2002 | Yamazaki et al. ............. 349/43 |
| 6,407,790 B1 | * | 6/2002 | Chen ......................... 349/124 |
| 6,441,873 B2 | * | 8/2002 | Young .......................... 349/43 |

* cited by examiner

Primary Examiner—Lynne A. Gurley
Assistant Examiner—Stanetta Isaac
(74) Attorney, Agent, or Firm—Sonnenschein, Nath & Rosenthal LLP (57) ABSTRACT

The present invention provides a method of manufacturing an active matrix reflecting liquid crystal display device including the step of forming and processing an interlayer insulating film. The step forming and processing an interlayer insulating film includes step A of forming the interlayer insulating film on a silicon film in which the sources and drains of TFTs are formed; step B of forming a photoresist layer on the interlayer insulating film; step C of patterning the photoresist layer in a specified pattern by using, as a photoresist mask for the photoresist layer, a mask having a pattern formed with a resolution limit or less corresponding to the reflecting electrode to be formed; and step D of etching the interlayer insulating film by using the photoresist layer patterned in step C as an etching mask. After step D, a metal film is deposited for simultaneously forming source electrodes, signal wiring, drain electrodes, and the reflecting electrode. The manufacturing method can thus be simplified to improve productivity.

1 Claim, 8 Drawing Sheets

Related Art

FIG. 13B

Related Art

FIG. 13C

Related Art

FIG. 13D

Related Art

FIG. 13E

Related Art

FIG. 13F

Related Art

FIG. 13G

Related Art

FIG. 13H

Related Art

METHOD FOR MAKING A REFLECTIVE LIQUID CRYSTAL DISPLAY DEVICE

RELATED APPLICATION DATA

The present application claims priority to Japanese Application(s) No(s). P2000-281012 filed Sep. 14, 2000, and P2000-361080 filed Nov. 28, 2000, which application(s) is/are incorporated herein by reference to the extent permitted by law.

BACKGROUND OF THE INVENTION

1. Field of the Invention

The present invention relates to a technique for simultaneously forming irregularity in a surface of a reflecting electrode and contact holes in an interlayer insulating film formed on a silicon film, in which sources and drains of TFTs are formed, above the sources or drains in a process for manufacturing a reflective liquid crystal display device, to shorten the manufacturing process.

2. Description of the Related Art

In a conventional active matrix reflective liquid crystal display device in which each of pixel electrodes comprises a reflecting electrode serving as a reflecting scattering plate by surface irregularity, a driving-side TFT substrate is manufactured as shown in FIG. 13. FIG. 13 shows a manufacturing process for a liquid crystal device having a pixel structure comprising bottom gate structure TFTs. However, a pixel structure comprising top gate structure TFTs can also be manufactured by basically the same process.

Figure 13A:
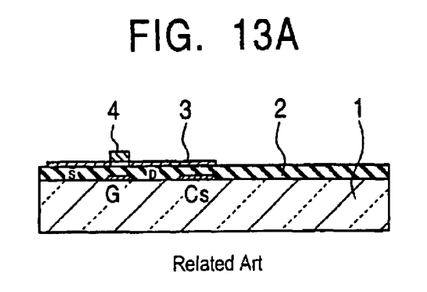
FIG. 13 is a drawing illustrating a conventional process for manufacturing an active matrix reflective liquid crystal display device.

First, as shown in FIG. 13A, a metal film is deposited on a transparent substrate 1, and then dry-etched by photolithography to form gates G and auxiliary capacitance electrodes Cs. Then, a gate insulating film 2 is deposited, and a polysilicon film 3 is further formed thereon.

Next, in order to prevent impurity injection into channel regions during impurity doping of source and drain regions, stoppers 4 are respectively formed on portions of the polysilicon film 3 corresponding to the channel regions in self-alignment with the gates G, followed by impurity doping of the source and drain regions.

Then, the polysilicon film 3 is separated into islands by photoresist step and etching step to form low-temperature polysilicon thin film transistors (TFTs).

Figure 13B:
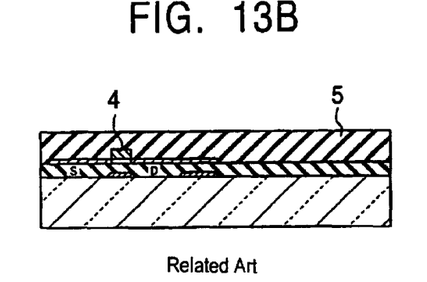
Figure 13C:
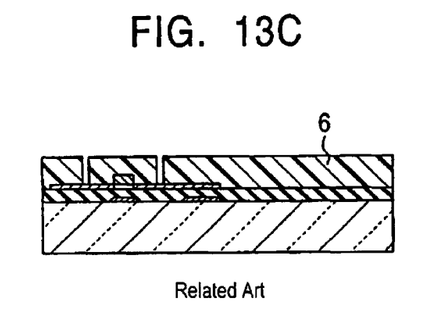
Figure 13D:
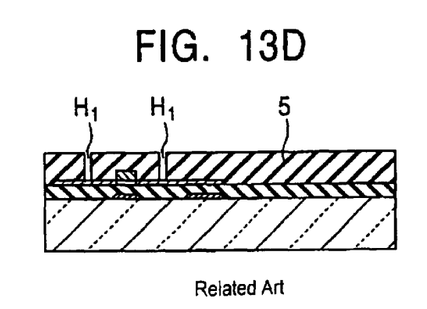

Next, an interlayer insulating film 5 is formed (FIG. 13B). In order to form contact holes in the interlayer insulating film 5, a photoresist layer 6 is first formed on the interlayer insulating film 5, and then patterned by photolithography using a patterned mask as a photomask in which apertures are formed in portions corresponding to the contact holes (FIG. 13C). Then, the interlayer insulating film 5 is etched by using the patterned photoresist layer 6 as an etching mask to form contact holes $H_1$ in the interlayer insulating film 5 (FIG. 13D).

Figure 13E:
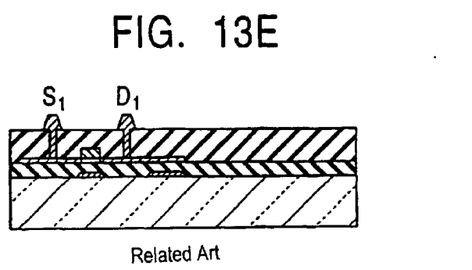

Next, a metal film is deposited by sputtering or the like, and then etched to form source electrodes $S_1$ connected to sources S of the TFTs through the contact holes $H_1$, signal wiring, and drain electrodes $D_1$ connected to drains D of the TFTs through the contact holes $H_1$ (FIG. 13E).

Figure 13F:
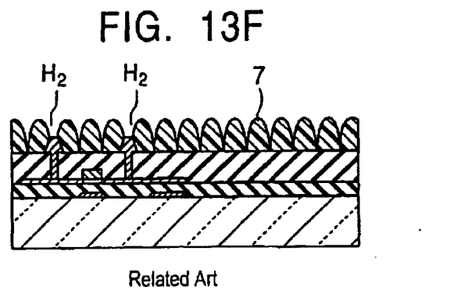
Figure 13G:
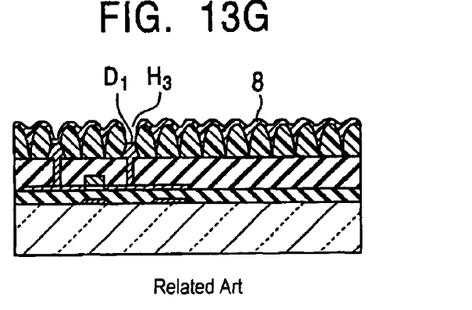

Next, an irregular shape as a base for forming surface irregularity in a reflecting electrode having a reflecting scattering ability is formed by using two layers each comprising a photoresist material as follows. First, a first layer 7 for forming the basic structure of the irregular shape is formed by photolithography using a photoresist material (FIG. 13F). The photomask used in this step has second contact holes $H_2$ communicating with the source electrodes $S_1$ or the drain electrodes $D_1$. Next, a second layer 8 for improving the reflecting property is formed by photolithography using the same photoresist material as the first layer 7 (FIG. 13G). The photomask used in this step has third contact holes $H_3$ communicating with the drain electrodes $D_1$. In this way, the surface irregular shape having a two-layer structure comprising the first and second layers 7 and 8 is formed.

Figure 13H:
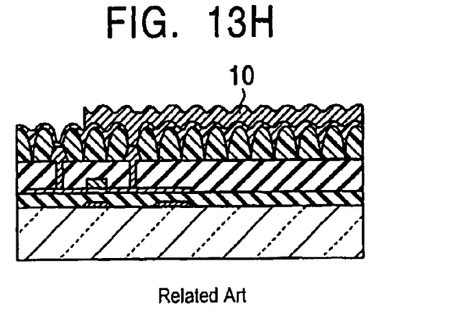

Next, a metal film of Al, Ag, or the like, which has high reflectance, is deposited, and then subjected to photolithography to form a reflecting electrode 10 (FIG. 13H).

In this way, the driving-side TFT substrate is completed. An alignment film is coated on each of the TFT substrate and a counter substrate on which a color filter and a counter transparent electrode are formed, and then subjected to alignment. Then, both substrates are bonded together with a sealing material by using a gap material for keeping an appropriate gap between both substrates, and a liquid crystal is injected into the gap, followed by sealing to obtain a liquid crystal display panel.

The method of manufacturing a driving-side TFT substrate of a conventional active matrix reflective liquid crystal display device shown in FIG. 13 requires the steps of respectively forming the first and second layers 7 and 8 each comprising a photoresist material and then patterning the layers by photolithography to provide the reflecting electrode 10 with the predetermined irregular surface shape. Therefore, a total of three insulating layers including the interlayer insulating film 5 is finally formed between the silicon film, in which the sources S and drains D of TFTs are formed, and the reflecting electrode 10. Also, the method comprises the separate steps of forming the source electrodes $S_1$ and the drain electrodes $D_1$, and forming the reflecting electrode 10, to cause the problem of increasing the number of the steps, thereby increasing the manufacturing cost.

SUMMARY OF THE INVENTION

Accordingly, it is an object of the present invention to simplify the process for manufacturing an active matrix reflective liquid crystal display device to improve productivity.

The inventors found a process for manufacturing a reflective liquid crystal display device in which a photoresist layer was provided on an interlayer insulating film formed on a silicon film in which sources and drains of TFTs were formed, and then patterned by photolithography using a specified photomask to simultaneously form apertures corresponding to contact holes to be formed above the sources or the drains, and an irregular shape in the photoresist layer corresponding to the surface irregularity of a reflecting electrode, and then the interlayer insulating film is etched by using the photoresist layer as an etching mask to simultaneously the contact holes and the irregular surface shape in the interlayer insulating film corresponding to the reflecting electrode. This could significantly shorten the process for manufacturing a liquid crystal display device.

Namely, the present invention provides a method of manufacturing an active matrix reflective liquid crystal display device comprising an interlayer insulating film formed on a silicon film in which sources and drains of TFTs are formed, and a reflecting electrode having an irregular surface and formed on the interlayer insulating film, the method comprising the step of forming and processing the interlayer insulating film. The step of forming and processing the interlayer insulating film comprises step A of forming the interlayer insulating film on the silicon film in which the sources and drains of TFTs are formed, step B of forming a photoresist layer on the interlayer insulating film, step C of patterning the photoresist layer by photolithography, and step D of etching the interlayer insulating film by using the photoresist layer patterned in step C as an etching mask. Step C uses, as a photoresist mask for the photoresist layer, a mask having a pattern formed with a resolution limit or less in a portion corresponding to the reflecting electrode to be formed, so that portions of the photoresist layer corresponding to the contact holes to be formed in the interlayer insulating film above the sources or drains can be completely removed, and surface irregularity can be formed in a portion of the photoresist layer corresponding to the reflecting electrode to be formed. In step D, portions of the interlayer insulating film corresponding to the contact holes are completely opened, and surface irregularity is formed in a portion of the interlayer insulating film corresponding to the reflecting electrode to be formed.

The manufacturing method further comprises, after step D, step E of depositing a metal film for simultaneously forming source electrodes communicating with the sources through the contact holes, signal wiring, drain electrodes communicating with the drains through the contact holes, and the reflecting electrode, step F of depositing a protecting film and patterning the protecting film to open portions of the protecting film corresponding to contact holes to be formed above the drain electrodes, and step G of forming a transparent conductive film on the protecting film so that the transparent conductive film is connected to the reflecting electrode through the contact holes. In step F of forming the protecting film comprising photoresist and patterning the protecting film, a mask having a pattern formed with a resolution limit or less in a portion corresponding to the reflecting electrode to be formed is used as a photoresist mask for the protecting film so that portions of the protecting film corresponding to the contact holes to be formed above the drains can be completely removed, and surface irregularity can be formed in the portion of the protecting film corresponding to the reflecting electrode to be formed.

The manufacturing method may further comprise, after step D, step E of depositing a metal film for simultaneously forming source electrodes communicating with the sources through the contact holes, signal wiring, drain electrodes communicating with the drains through the contact holes, and the reflecting electrode, and step $G_y$ of forming a transparent conductive film on the reflecting electrode so that the transparent conductive film is connected to the reflecting electrode.

The manufacturing method may further comprise, after step D, step $E_x$ of depositing a transparent conductive film for simultaneously forming pattern portions corresponding to source electrodes communicating with the sources through the contact holes, signal wiring, drain electrodes communicating with the drains through the contact holes, and the reflecting electrode, and step $G_y$ of forming a transparent conductive film on the reflecting electrode so that the transparent conductive film is connected to the reflecting electrode.

The present invention also provides an active matrix reflective liquid crystal display device comprising an insulating layer formed on a silicon film in which sources and drains of TFTs are formed, and a reflecting electrode having an irregular surface and formed on the insulating layer, wherein the insulating layer comprises a single insulating film.

The liquid crystal display device further comprises a transparent conductive film formed on the reflecting electrode so that the transparent conductive film is connected to the reflecting electrode, and a protecting film provided between the reflecting electrode and the transparent conductive film so that the cell gap of a liquid crystal display cell is set to $¼\lambda$, wherein surface irregularity is formed in the transparent conductive film formed on the reflecting electrode.

In the liquid crystal display device of the present invention, the reflecting electrode may be deposited on the insulating layer through the transparent conductive film.

DESCRIPTION OF THE PREFERRED EMBODIMENTS

The present invention will be described in detail below with reference to the drawings. In the drawings, the same reference numerals respectively denote the same or equivalent components.

FIG. 1 is a drawing illustrating the steps of a method of manufacturing a liquid crystal display device having a pixel structure comprising bottom gate structure TFTs according to an embodiment of the present invention.

Figure 1A:
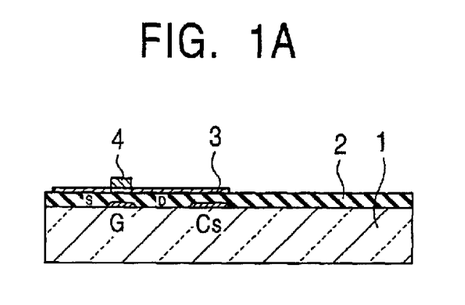
FIG. 1 is a drawing illustrating the steps of a method of manufacturing a liquid crystal display device according an embodiment of the present invention.

In this method, as shown in FIG. 1A, a metal film of Mo, Cr, Al, Ta, W, or the like is first deposited on a transparent substrate 1, and then dry-etched by photolithography to form gates G and auxiliary capacitance electrodes Cs, and a silicon nitride film or silicon oxide film, or a laminate thereof is formed as a gate insulating film 2 by sputtering or CVD. Furthermore, a polysilicon film 3 is formed on the gate insulating film 2. The polysilicon film forming method comprises forming a semiconductor layer on the gate insulating film 2, dehydrogenating the semiconductor layer by high-temperature treatment in order to decrease the hydrogen concentration of the semiconductor layer, and then crystallizing the semiconductor layer with an excimer laser to convert the semiconductor layer to the polysilicon film. With a hydrogen concentration of 1 atomic % or less, the dehydrogenating step may be omitted. In order to stabilize film quality, the gate insulating film and the semiconductor layer are preferably continuously deposited.

Next, in order to prevent impurity injection into channel regions during impurity doping of source regions and drain regions, stoppers 4 are respectively formed on the portions of the polysilicon film 3, in which the channel regions are formed, in self-alignment with the gates G. The stoppers 4 are formed by depositing a stopper film comprising silicon oxide on the gate insulating film 2, coating a resist on the stopper film, exposing the resist layer from the back side using the gates G as a mask to pattern the resist corresponding to the channel regions in self-alignment with the gates G, and then etching the stopper film by using the resist as a mask to leave the stopper film in the portions corresponding to the channel regions.

Then, the source regions and drain regions are doped with impurities by an ion implantation or ion doping method to form sources S and drains D. The polysilicon film is divided into islands by using a photoresist step and an etching step to form TFTs. The above-described method of forming TFTs is a method of forming low-temperature polysilicon thin film transistors, and the manufacturing method of the present invention can also be applied to the formation of amorphous silicon thin film transistors.

The next step of forming and processing an interlayer insulating film comprises the following steps A to D.

Figure 1B:
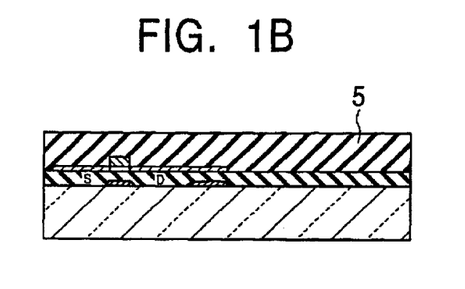

Step A: The interlayer insulating film 5 comprising an inorganic insulating material such as a silicon nitride film a silicon oxide film, a laminate of these films, or the like is formed by the CVD or sputtering process (FIG. 1B).

Step B: A photoresist layer 6 is formed on the interlayer insulating film 5.

Figure 1C:
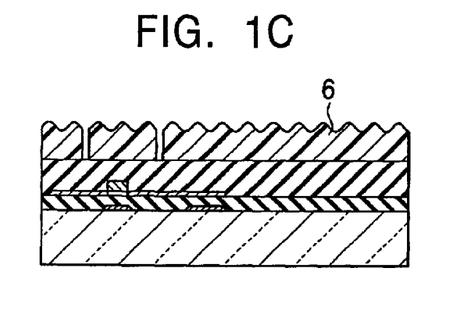

Step C: The photoresist layer 6 is patterned by photolithography (FIG. 1C). In this step, a mask having a pattern formed with a stepper resolution limit or less corresponding to the reflecting electrode to be formed is used as a photomask for the photoresist layer 6 so that portions of the photoresist layer 6 corresponding to the contact holes $H_1$ to be formed in the interlayer insulating film 5 above the sources S or the drains D are completely removed, and surface irregularity is formed in a portion of the photoresist layer 6 corresponding to the reflecting electrode to be formed.

Figure 6:
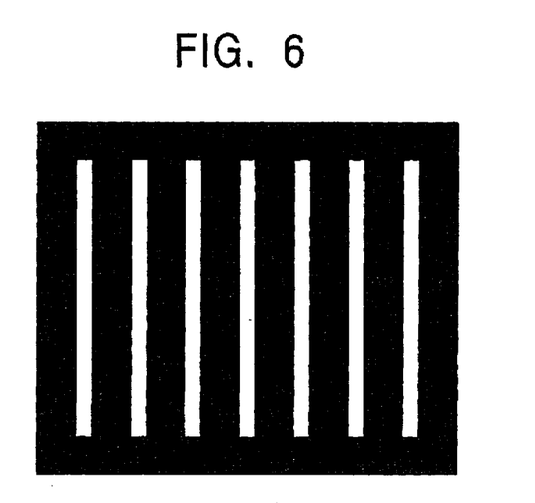
FIG. 6 is a plan view of a photomask having a L/S pattern.
Figure 7:
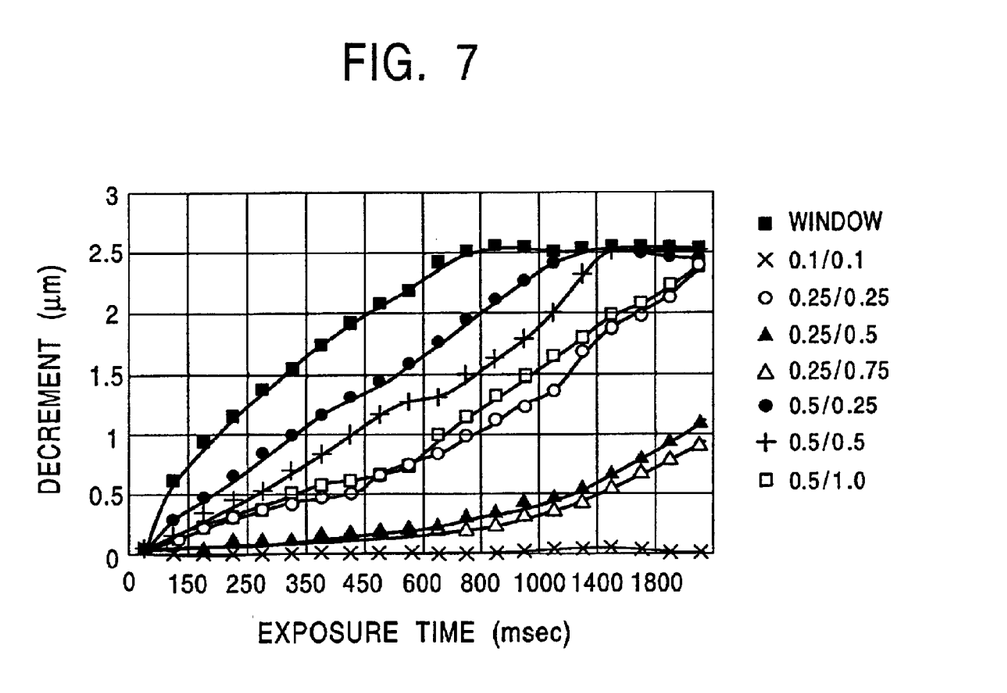
FIG. 7 is a graph showing the relation between L/S of a photomask, the exposure time and the thickness decrement of a photoresist layer in the photolithography step for a photoresist layer.

The shape of the photomask can be determined by experimentally determining the relation between the pattern of the photomask, the thickness decrement of the photoresist layer and the exposure time. For example, when the line/space (referred to as "L/S" hereinafter) pattern shown in FIG. 6 is exposed through the stepper, the relation between the thickness decrement of the photoresist layer and the exposure time changes according to L/S, as shown in FIG. 7. In FIG. 7, "Window" represents a case in which S is higher than the resolution of an exposure device, and the numerical values on the right side of symbols x, etc. denote L ($\mu$m)/S ($\mu$m). FIG. 7 indicates that with an exposure of 1200 msec with which portions of the photoresist layer corresponding to the contact holes to be formed are completely opened, the thickness decrement of the photoresist layer can be set to 0.6 $\mu$m when L=0.25 $\mu$m and S=0.50 $\mu$m.

Figure 8:
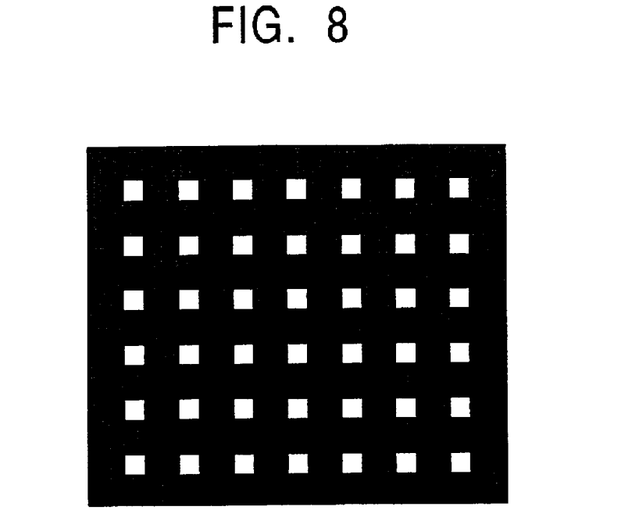
FIG. 8 is a plan view of a photomask having a dot pattern.
Figure 9:
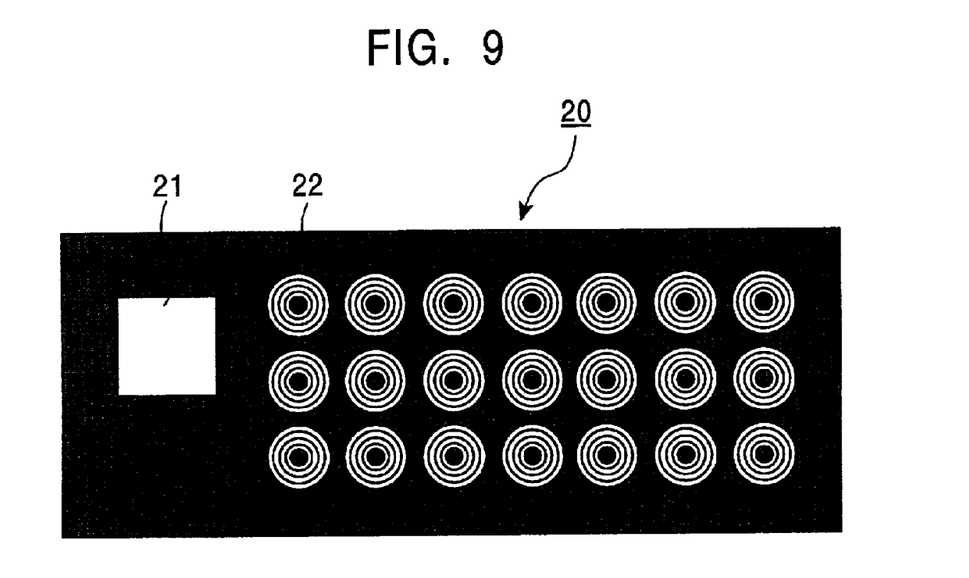
FIG. 9 is a plan view of a photomask used for a photoresist layer.

In experimentally determining the thickness decrement of the photoresist layer, the dot patter shown in FIG. 8 may be used in place of the L/S pattern shown in FIG. 6.

Besides these methods, the more definite shape of the photomask can be calculated from the constants of an optical system, and thus the thickness of the photoresist layer can be controlled by the effective transmittance of the photomask.

Figure 10A:
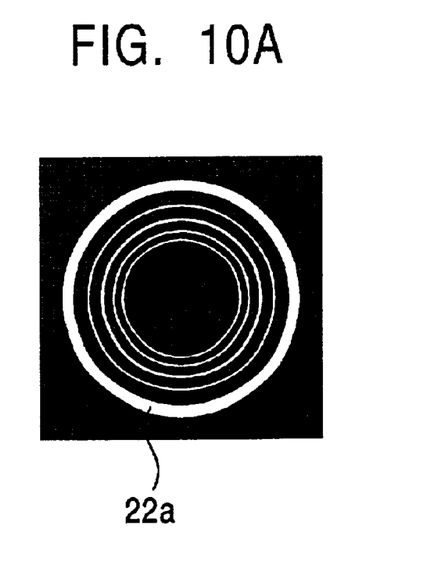
FIG. 10A is a plan view of the pattern of a photomask for forming surface irregularity in a photoresist layer.
Figure 10B:
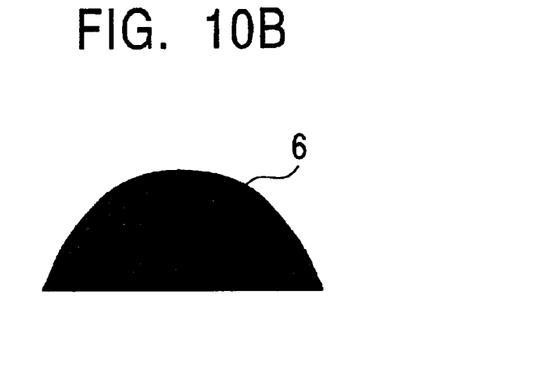
FIG. 10B is a side view of the surface irregularity of the photoresist layer formed by using the mask.

As the actual pattern of the photomask, a pattern which can be resolved by the stepper is provided stepwise or continuously. For example, in forming a portion 21 where the photoresist layer is completely opened by exposure, and a portion where surface irregularity is formed in the photoresist layer, each of the pattern portions 22 shown in FIG. 22 where surface irregularity is formed can be formed in a cyclic pattern comprising a plurality of fine concentric circles which cannot be resolved by the stepper. By exposure and development using such a photomask for the photoresist layer, the completely open portion and the portion where surface irregularity is formed can be formed in the photoresist layer. However, by heating reflow after development, the shape of each of the pattern portions of the photoresist layer 6 in which surface irregularity is formed, can be smoothed, as shown in FIG. 10B.

Figure 11A:
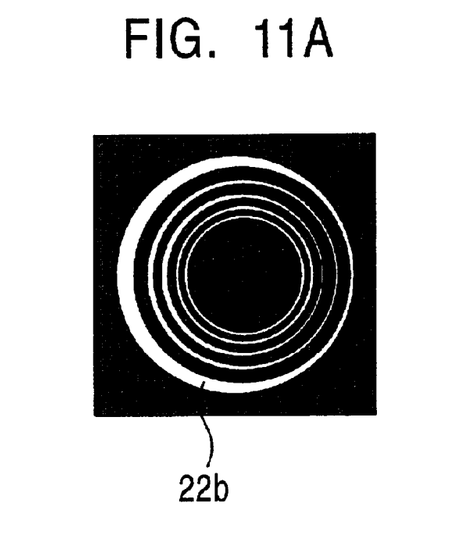
FIG. 11A is a plan view of the pattern of another photomask for forming a surface irregularity in a photoresist layer.
Figure 11B:
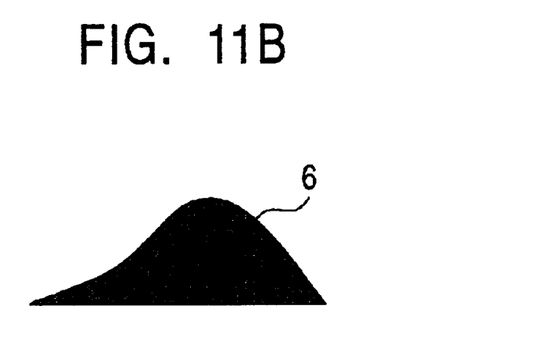
FIG. 11B is a side view of the surface irregularity of the photoresist layer formed by using the mask.

As the pattern of the photomask, a specified pattern may be used, which corresponds to the shape of surface irregularity so as to form surface irregularity in the interlayer insulating film 5 to increase the reflectance of the reflecting electrode in the specified direction. For example, as shown in FIG. 11A, a plurality of circular patterns are decentered. By exposure and development, and, if required, reflow using this photomask for the photoresist layer 6, the pattern portions of the photoresist layer 6, in which surface irregularity is formed, can be formed in a shape in which one of the sides steeply slopes, and the other side gently slopes.

Figure 12:
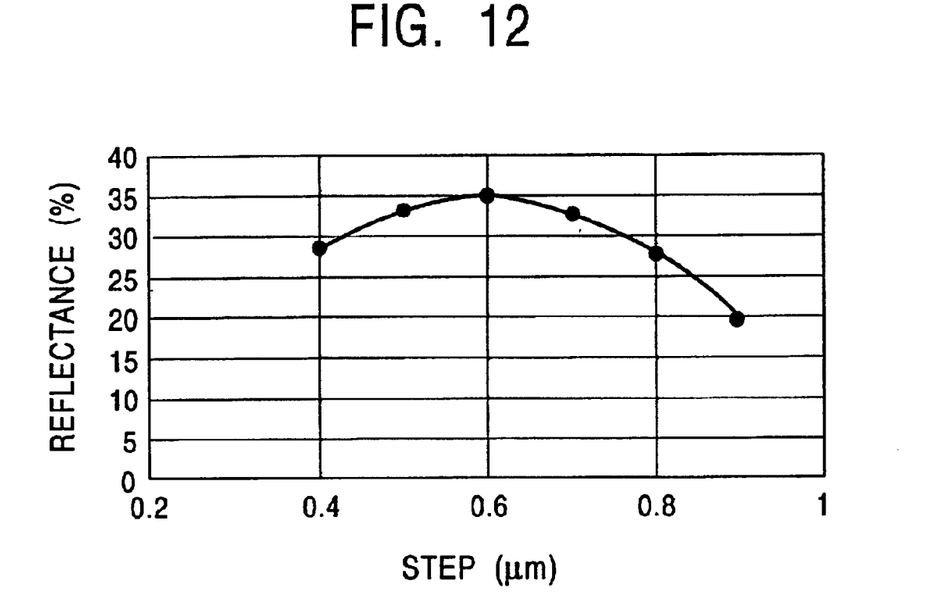
FIG. 12 is a graph showing the relation between the step of surface irregularity of a reflecting electrode and reflectance.

Also, the reflectance of the reflecting electrode depends upon the step difference of the pattern formed in the photoresist layer 6, as shown in FIG. 12, and the step difference of the pattern depends upon the pattern shape of the photomask, the exposure, etc. Therefore, the pattern of the photomask, and the exposure of the photoresist layer 6 are appropriately set so as to form a step difference which permits the reflecting electrode to obtain predetermined reflectance.

Then, the interlayer insulating film 5 is dry-etched by using the patterned photoresist layer 6 as the etching mask to transfer the shape of the photoresist layer 6 to the interlayer insulating film 5. Therefore, the following step D is performed.

Figure 1D:
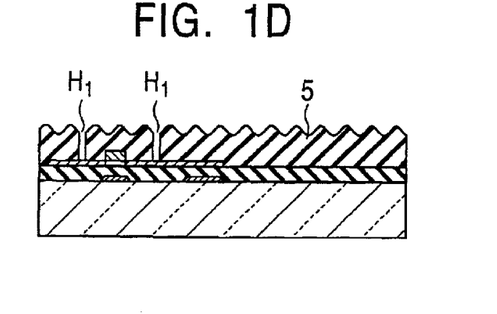

Step D: The interlayer insulating film 5 is etched by a resist back-step dry etching method such as a RIE or ICP method, or the like using the photoresist layer 6 patterned in the above-described step C as the etching mask so that the portions of the interlayer insulating film 5 corresponding to the contact holes $H_1$ to be formed are completely opened, and surface irregularity is formed in the portion of the interlayer insulating film 5 corresponding to the reflecting electrode to be formed (FIG. 1D).

After the interlayer insulating film 5 is formed in step D, an insulating film need not be further deposited for forming surface irregularity in the reflecting electrode. Therefore, a metal film is deposited on the interlayer insulating film 5 to form the reflecting electrode, thereby simply obtaining the driving-side TFT substrate and manufacturing an active matrix reflective liquid crystal display device. In this case, any desired method can be used for forming the reflecting electrode, and any layers such as a protecting layer, and the like may be further provided according to demand. By using the TFT substrate, a liquid crystal display panel can be produced by a conventional method to manufacture a liquid crystal display device.

The thus-produced liquid crystal display device is the same as a known active matrix reflective liquid crystal display device in that the insulating layer is formed on the silicon film in which the sources S and the drains D of the TFTs are formed, and the reflecting electrode having surface irregularity and serving as a reflecting scattering plate are formed on the insulating layer. However, the liquid crystal display device of the present invention is characterized in that the insulating layer between the silicon film and the reflecting electrode comprises a single insulating film. Therefore, the present invention includes a liquid crystal display device having such a structure.

Figure 1E:
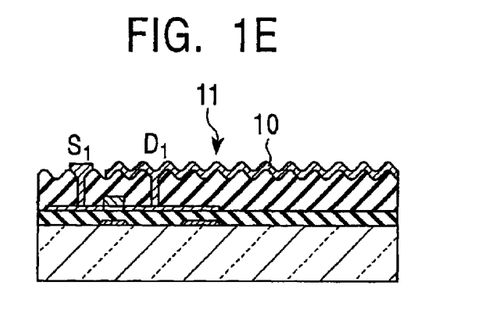
Figure 1F:
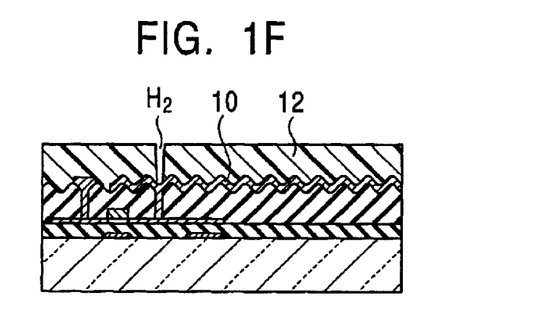
Figure 1G:
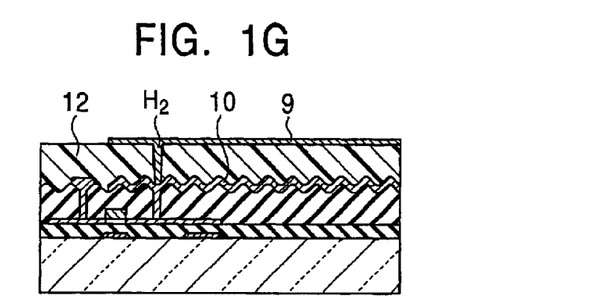

The method of manufacturing a liquid crystal display device of the present invention further comprises the following steps E to G, which are successively performed after step D, as shown in FIGS. 1E to 1G.

Step E: A metal having a high reflectance, such as Al, Ag, an Al alloy, an Ag alloy, or the like, is deposited by sputtering to form a metal film 11, patterned by photolithography and then etched to simultaneously form the source electrodes $S_1$ communicating with the sources S through the contact holes $H_1$, signal wiring, the drain electrodes $D_1$ communicating with the drains D through the contact holes $H_1$, and the reflecting electrode (FIG. 1E). In this case, the metal film 11 may have a multilayer structure comprising a conductive film of Al, Ag, an Al alloy, or an Ag alloy having high reflectance, and a metal film of Cr, Mo, Ti, Ta, W, or the like.

Step F: A protecting film 12 comprising photoresist is formed in a region including the reflecting electrode 10, and then patterned to form holes at positions of the protecting film 12, which correspond to the drain electrodes $D_1$ (FIG. 1F). As the method of forming the protecting film 12, a silicon oxide or the like may be deposited and then patterned by photolithography and etching. However, from the viewpoint of shortening the process, the preferred method comprises depositing a photoresist and then patterning the deposited film only by photolithography, like the above-described step F.

The thickness of the protecting film 12 is preferably set so that the cell gap of a liquid crystal cell is ¼λ. This cell gap of the liquid crystal cell is generally required from the viewpoint of brightening the screen of the reflective liquid crystal display panel.

Figure 2:
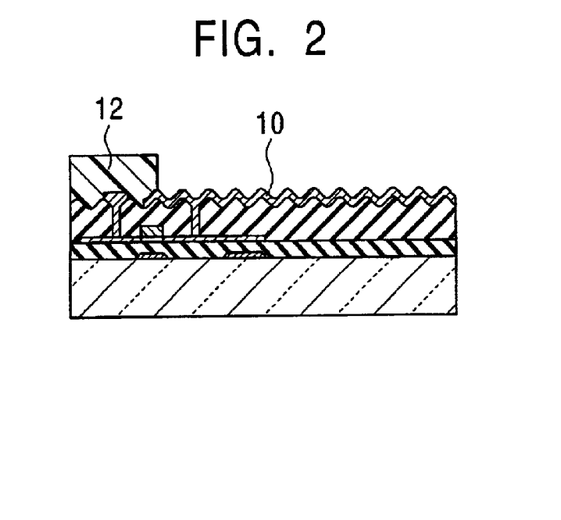
FIG. 2 is a sectional view of a TFT substrate obtained by a manufacturing method of the present invention.

The protecting film 12 is not necessarily formed in the region including the reflecting electrode 10, and the protecting film 12 may be formed only in the region excluding the pixel region to form the TFT substrate, as shown in FIG. 2.

Step G: As shown in FIG. 1G, a transparent conductive film 9 is formed on the protecting film 12 to be patterned to cover the reflecting electrode to obtain the TFT substrate. The transparent conductive film 9 is deposited by, for example, sputtering ITO, and then patterning the deposited film by photolithography and etching. In the present invention, the transparent conductive film 9 is not necessarily provided on the reflecting electrode 10. However, the transparent conductive film is electrically connected to the reflecting electrode 10 at the same potential through the contact holes $H_2$ to prevent a precipitation phenomenon in which Ag of the reflecting electrode 10 is transferred to the counter substrate in the liquid crystal cell.

The liquid crystal cell is obtained by coating an alignment film on each of the TFT substrate obtained as described above, and the counter substrate on which a color filter and a counter electrode are formed, performing alignment, bonding both substrate together with a sealing material to maintain an appropriate gap between both substrates, injecting a liquid crystal, and then sealing the substrates.

Figure 3A:
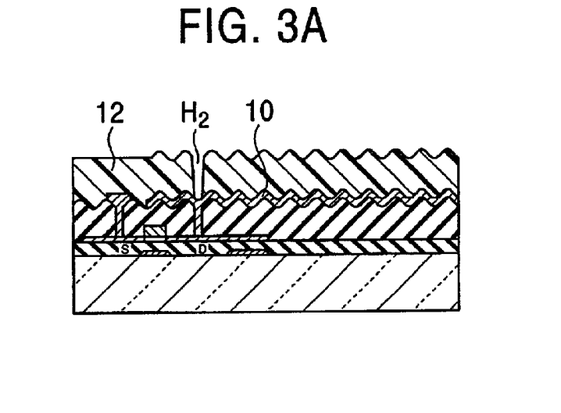
FIG. 3 is a drawing illustrating the steps of a method of manufacturing a liquid crystal display device of the present invention.
Figure 3B:
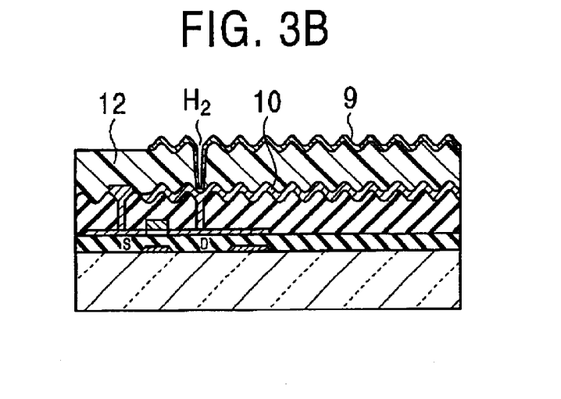

In a manufacturing method according to another embodiment of the present invention, the above-described step F of patterning the protecting film 12 is performed by exposing and developing the protecting layer 12 using, as a photomask for the protecting film 12, a mask having a pattern formed with a resolution limit of the stepper or less corresponding to the reflecting electrode to be formed, so that the portions of the protecting film 12 comprising photoresist, which correspond to the contact holes to be formed above the drain electrodes $D_1$, can be completely removed, and surface irregularity can be formed in the portion which corresponds to the reflecting electrode to be formed, according to the above step C of patterning the photoresist layer 6. By this method, the protecting film 12 can be patterned, as shown in FIG. 3A.

After the protecting film 12 is patterned, like in the above-described step G, the transparent conductive film 9 is formed on the protecting film 12 to obtain the TFT substrate. In the thus-obtained TFT substrate, external light incident on the nearly plane-reflecting bottom of the surface irregularity of the reflecting electrode 10 is scattered due to a difference between the refractive indexes of the protecting film 12 and the transparent conductive film 9 to decrease the ratio of external light incident on the flat portion of the reflecting electrode 10, and the light reflected by the reflecting electrode 10 is further scattered to improve the reflection performance of pixels.

Figure 4:
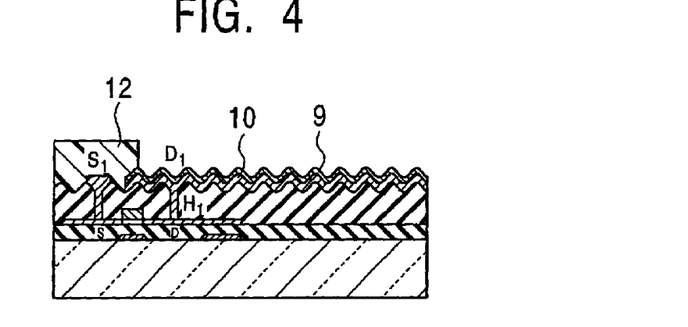
FIG. 4 is a sectional view of a TFT substrate obtained by a manufacturing method according to another embodiment of the present invention.

A manufacturing method according to a further embodiment of the present invention comprises forming the transparent conductive film 9 in the same manner as step G without forming the protecting film on the pixel region after the source electrodes $S_1$, signal wiring, the drain electrodes $D_1$ and the reflecting electrode 10 is formed in the above-described step E to produce such a TFT substrate as shown in FIG. 4.

Figure 5:
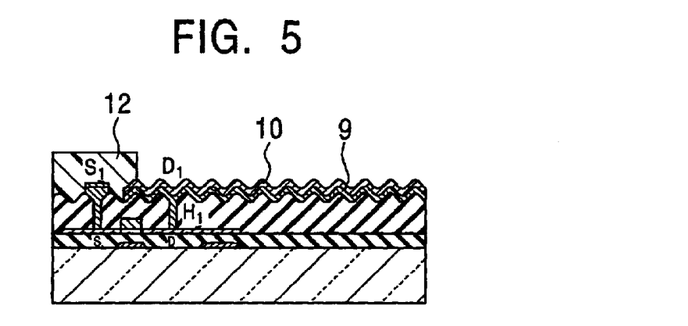
FIG. 5 is a sectional view of a TFT substrate obtained by a manufacturing method according to a further embodiment of the present invention.

Alternatively, after the step D of etching the interlayer insulating film 5, the following steps $E_x$ and $G_x$ may be successively performed to produce a TFT substrate in which the reflecting electrode 10 is deposited on the transparent conductive film 9, as shown in FIG. 5.

Step $E_x$: The transparent conductive film 9 is deposited to form a pattern including the portions which correspond to the source electrodes $S_1$ communicating with the sources S through the contact holes $H_1$, signal wiring, the drain electrodes $D_1$ communicating with the drains D through the contact holes $H_1$, and the reflecting electrode 10.

Step $G_x$: A metal film of Al, Ag, an Al alloy, an Ag alloy, or the like is deposited to form the reflecting electrode 10 so that the reflecting electrode 10 is connected to the transparent conductive film 9.

When ITO is deposited for forming the transparent conductive film 9, Mo or Ti is preferably deposited on the ITO film, and then the metal film 11 is deposited thereon.

Although the present invention has been described above with reference to the drawings, various other embodiments can be made. For example, although the drawings show a liquid crystal display device having a pixel structure comprising bottom-gate structure TFTs, the present invention can be applied to a liquid crystal display device having a pixel structure comprising top-gate structure TFTs.

In accordance with the present invention, a method of manufacturing an active matrix reflective liquid crystal display device comprises providing a photoresist layer on an interlayer insulating film formed on a silicon film in which sources and drains of TFTs are formed, patterning the photoresist by using a specified photomask to simultaneously form apertures corresponding to contact holes to be formed above the sources or drains and a shape corresponding to surface irregularity of a reflecting electrode, and etching the interlayer insulating film by using the photoresist layer as an etching mask to simultaneously form the contact holes in the interlayer insulating film and the surface irregularity shape of the reflecting electrode. It is thus possible to reduce the steps of laminating a photoresist layer required for forming a surface irregularity shape of a reflecting electrode in a conventional active matrix reflecting liquid crystal display device. Also, source electrodes, signal wiring, drain electrodes and reflecting electrodes, which are formed in separate steps in a conventional method, can be simultaneously formed by depositing a single metal film and patterning it. Therefore, the process for manufacturing a liquid crystal display device can be significantly simplified to improve productivity.

In the present invention, a transparent conductive film may be formed on the reflecting electrode so that the transparent conductive film is electrically connected to the reflecting electrode at the same potential, thereby preventing a precipitation phenomenon in which Ag of the reflecting electrode is transferred to a counter substrate in a liquid crystal display cell.

Furthermore, in the present invention, a protecting film may be provided between the reflecting electrode and the transparent conductive film so that the optical properties of the liquid crystal display cell can easily be optimized by controlling the thickness of the protecting film.

What is claimed is:

1. A method of manufacturing an active matrix reflective liquid crystal display device comprising an interlayer insulating film formed on a silicon film in which sources and drains of TFTs are formed, and a reflecting electrode having an irregular surface and formed on the interlayer insulating film, the method comprising the step of forming and processing the interlayer insulating film comprising steps A to G:

step A of forming the interlayer insulating film on the silicon film in which the sources and drains of TFTs are formed;

step B of forming a photoresist layer on the interlayer insulating film;

step C of patterning the photoresist layer by photolithography uses, in which a mask having a pattern formed with a resolution limit or less corresponding to the reflecting electrode to be formed is used as a photoresist mask for the photoresist layer so that portions of the photoresist layer corresponding to contact holes to be formed in the interlayer insulating film above the sources or drains can be completely removed, and surface irregularity can be formed in a portion of the photoresist layer corresponding to the reflecting electrode to be formed; and step D of etching the interlayer insulating film by using the photoresist layer patterned in step C as an etching mask so that portions of the interlayer insulating film, which correspond to the contact holes to be formed, are completely opened, and surface irregularity is formed in a portion of the interlayer insulating film which corresponds to the reflecting electrode to be formed;

step E of depositing a metal film for simultaneously forming source electrodes communicating with the sources through the contact holes, signal wiring, drain electrodes communicating with the drains through the contact holes, and the reflecting electrode;

step F of depositing a protecting film and patterning the protecting film to open portions of the protecting film which correspond to contact holes to be formed above the drain electrodes; and step G of forming a transparent conductive film on the protecting film so that the transparent conductive film is connected to the reflecting electrode through the contact holes, wherein step F comprises forming the protecting film comprising photoresist and patterning the protecting film by using, as a photoresist mask for the protecting film, a mask having a pattern formed with a resolution limit or less corresponding to the reflecting electrode to be formed, so that the portions of the protecting film corresponding to the contact holes to be formed above the drains can be completely removed, and surface irregularity can be formed in the portion of the protecting film corresponding to the reflecting electrode to be formed.

* * * * *